US011956628B2

(12) United States Patent
Grayson et al.

(10) Patent No.: US 11,956,628 B2
(45) Date of Patent: Apr. 9, 2024

(54) OPENROAMING FOR PRIVATE COMMUNICATION SYSTEMS

(71) Applicant: Cisco Technology, Inc., San Jose, CA (US)

(72) Inventors: Mark Grayson, Maidenhead (GB); Bart A. Brinckman, Nevele (BE); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 229 days.

(21) Appl. No.: 17/492,045

(22) Filed: Oct. 1, 2021

(65) Prior Publication Data

US 2022/0167160 A1    May 26, 2022

Related U.S. Application Data

(60) Provisional application No. 63/117,010, filed on Nov. 23, 2020.

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0892* (2013.01); *H04W 12/71* (2021.01); *H04W 48/20* (2013.01)

(58) Field of Classification Search
CPC ..... H04W 12/06; H04W 12/71; H04W 48/20; H04W 8/18; H04W 8/06; H04L 63/0892;
(Continued)

(56) References Cited

U.S. PATENT DOCUMENTS 7,096,014 B2    8/2006   Haverinen et al.
9,392,010 B2 *  7/2016   Friedman .............. H04L 63/102
(Continued)

FOREIGN PATENT DOCUMENTS

JP        6449739 B2      1/2019
WO     2014160935 A2    10/2014
(Continued)

OTHER PUBLICATIONS

Ding et al., "A Flow-Based Authentication Handover Mechanism for Multi-Domain SDN Mobility Environment", Sep. 2017, China Communications, vol. 14, No. 9, pp. 127-143 (Year: 2017).*
(Continued)

*Primary Examiner* — Kenneth W Chang
(74) *Attorney, Agent, or Firm* — Edell, Shapiro & Finnan, LLC

(57) ABSTRACT

A method is provided that includes obtaining an access request for a device to access a visited access network, the access request including an authentication identifier for the device including an identity for the device and a realm comprising a network identifying portion; determining a re-write rule for the realm by querying a database based on an identity type of the device and the network identifying portion of the realm, the database including a plurality of re-write rules for a plurality of networks and a plurality of identity types; re-writing the realm based on the re-write rule using the identity for the device to generate a re-written realm; obtaining, based on the re-written realm, an address for an authentication server of an identity provider associated with the device; and performing an authentication with the authentication server using the authentication identifier to authenticate the device for the visited access network.

20 Claims, 6 Drawing Sheets

(51) Int. Cl.
  *H04W 12/71* (2021.01)
  *H04W 48/20* (2009.01)
(58) Field of Classification Search
  CPC ........... H04L 2101/654; H04L 61/4511; H04L 2101/35; H04L 61/301
  See application file for complete search history.

(56) References Cited

U.S. PATENT DOCUMENTS

| | | | |
|---|---|---|---|
| 9,980,133 | B2 | 5/2018 | Barrett et al. |
| 10,609,634 | B2 | 3/2020 | Graybeal et al. |
| 10,616,764 | B2 | 4/2020 | Rommer et al. |
| 10,674,431 | B2 | 6/2020 | Sabeur et al. |
| 10,827,019 | B2 | 11/2020 | Rubin et al. |
| 2006/0121894 | A1 | 6/2006 | Ganesan |
| 2007/0097983 | A1 | 5/2007 | Nylander et al. |
| 2007/0282909 | A1* | 12/2007 | Watson ............... G06F 21/6218 |
| 2008/0076413 | A1 | 3/2008 | Jones |
| 2008/0101358 | A1 | 5/2008 | Van Ewijk et al. |
| 2008/0170524 | A1* | 7/2008 | Dang ........................ H04W 8/26 370/310 |
| 2008/0242298 | A1* | 10/2008 | Nylander ............... H04W 48/18 455/435.2 |
| 2008/0254833 | A1* | 10/2008 | Keevill .................. H04W 88/08 455/558 |
| 2009/0156253 | A1 | 6/2009 | Shi et al. |
| 2009/0191915 | A1 | 7/2009 | Abramson et al. |
| 2010/0169638 | A1* | 7/2010 | Farris .................. H04L 63/0471 713/153 |
| 2010/0281530 | A1 | 11/2010 | Tarkoma |
| 2010/0296445 | A1* | 11/2010 | Sarikaya ............. H04L 61/4511 370/328 |
| 2011/0124313 | A1 | 5/2011 | Jones |
| 2012/0079569 | A1 | 3/2012 | Mendelovich et al. |
| 2012/0084449 | A1 | 4/2012 | Delos Reyes et al. |
| 2012/0106468 | A1 | 5/2012 | Engstrom et al. |
| 2014/0349611 | A1 | 11/2014 | Kant et al. |
| 2015/0092654 | A1 | 4/2015 | Ahmavaara |
| 2015/0302413 | A1 | 10/2015 | Dua |
| 2016/0065747 | A1 | 3/2016 | Haspekian et al. |
| 2016/0308842 | A1* | 10/2016 | Choe .................. H04L 63/0428 |
| 2017/0156105 | A1 | 6/2017 | Mustajarvi et al. |
| 2017/0230905 | A1 | 8/2017 | Pularikkal et al. |
| 2017/0238245 | A1 | 8/2017 | Mathai et al. |
| 2017/0359773 | A1 | 12/2017 | Boodannavar et al. |
| 2018/0063776 | A1 | 3/2018 | Gupta |
| 2018/0109465 | A1 | 4/2018 | Gonguet et al. |
| 2018/0206166 | A1 | 7/2018 | Ganesan et al. |
| 2019/0174314 | A1 | 6/2019 | Joseph et al. |
| 2019/0215692 | A1 | 7/2019 | Grayson et al. |
| 2019/0380033 | A1 | 12/2019 | Wu et al. |
| 2020/0022193 | A1 | 1/2020 | Ma et al. |
| 2020/0146009 | A1 | 5/2020 | Wiatrowski et al. |
| 2020/0163013 | A1 | 5/2020 | Grayson et al. |
| 2020/0296660 | A1 | 9/2020 | Wang et al. |
| 2021/0029531 | A1 | 1/2021 | Mote et al. |
| 2021/0058391 | A1 | 2/2021 | Graybeal et al. |
| 2021/0058776 | A1 | 2/2021 | Nair et al. |
| 2021/0099869 | A1 | 4/2021 | Palanigounder et al. |
| 2021/0120425 | A1 | 4/2021 | Fikouras et al. |
| 2021/0136583 | A1 | 5/2021 | Gundavelli et al. |

FOREIGN PATENT DOCUMENTS

| | | |
|---|---|---|
| WO | 2017220124 A1 | 12/2017 |
| WO | 108271230 A | 7/2018 |
| WO | 2018164612 A1 | 9/2018 |
| WO | 2020046348 A1 | 3/2020 |
| WO | 2020221324 A1 | 11/2020 |
| WO | 2020231305 A1 | 11/2020 |
| WO | 2021087973 A1 | 5/2021 |
| WO | 2021089396 A1 | 5/2021 |
| WO | 2021094349 A1 | 5/2021 |

OTHER PUBLICATIONS

Wireless Broadband Alliance, "Wi-Fi Roaming—from 'old school' to 'new opportunities'", 8 pages, retrieved from Internet Aug. 8, 2020; https://wballiance.com/wi-fi-roaming-from-old-school-to-new-opportunities/.

Wireless Broadband Alliance, "How does WBA OpenRoaming™ work?", 4 pages, retrieved from Internet Aug. 10, 2020; https://wballiance.com/openroaming/how-it-works/.

A. Gulbrandsen et al., "A DNS RR for specifying the location of services (DNS SRV)", Network Working Group, Request for Comments (RFC) 2782, Feb. 2000, 12 pages.

Ping Identity, "The Primer: Nuts and Bolts of Federated Identity Management", Ping Identity White Paper, 2008, 12 pages, retrieved from Internet Aug. 10, 2020.

Matt MacPherson, "The Next Generation Experience", Cisco, Jan. 2020, 54 pages.

International Search Report and Written Opinion in International Application No. PCT/US2020/046093, dated Nov. 17, 2020, 15 pages.

Zdarsky, Frank A. et al., "Localization of Data and Control Plane Traffic in Enterprise Femtocell Networks", 2011 IEEE 73rd Vehicular Technology Conference (VTC Spring), https://ieeexplore.ieee.org/document/5956622, May 15, 2011, 5 pages.

Cooney, Michael, "Cisco moves Wi-Fi roaming technology to wireless broadband consortium", Mar. 20, 2020, 3 pages.

GillottResearch Inc., "Hotspot 2.0: Passing Go", Whitepaper, Published Fourth Quarter, 2012, Version 1.0, 15 pages.

"Series E: Overall Network Operation, Telephone Service, Service Operation and Human Factors" International Telecommunication Union, ITU-T, E.212, Sep. 2016, 26 pages.

"Series E: Overall Network Operation, Telephone Service, Service Operation and Human Factors," International Telecommunication Union, ITU-T, E.212, Amendment 1, Jul. 2018, 28 pages.

"Series E: Overall Network Operation, Telephone Service, Service Operation and Human Factors," International Telecommunication Union, ITU-T, E.212, Amendment 2, Jun. 2020, 30 pages.

"Series E: Overall Network Operation, Telephone Service, Service Operation and Human Factors," International Telecommunication Union, ITU-T, E.212, Amendment 3, Dec. 2020, 36 pages.

"Official Document IR.67—DNS Guidelines for Service Providers and GRX and IPX Providers", GSM Association, Version 16.0, Jun. 15, 2020, 74 pages.

"LTE and EPC Roaming Guidelines," GSM Association, IR.88, Version 21.0, Jun. 5, 2020, 98 pages.

3GPP, "3rd Generation Partnership Project; Technical Specification Group Core Network and Terminals; Numbering, addressing and identification; (Release 16)," 3GPP TS 23.003 V16.3.0, Jun. 2020, 141 pages.

International Search Report and Written Opinion in counterpart International Application No. PCT/US2021/059502, dated Feb. 22, 2022, 14 pages.

3GPP, "3rd Generation Partnership Project; Technical Specification Group Core Network and Terminals; Numbering, addressing and identification; (Release 16)," 3GPP TS 23.003, V16.4.0, Technical Specification, https://www.3gpp.org/ftp//Specs/archive/23_series/23.003/23003-g40.zip, Sep. 2020, 141 pages.

Dekok, "The Network Access Identifier," Internet Engineering Task Force (IETF), Request for Comments: 7542, https://www.rfc-editor.org/rfc/pdfrfc/rfc7542.txt.pdf, May 2015, 30 pages.

CBRS Alliance, "CBRS Alliance Identifier Administration Guidelines for Shared HNI," CBRSA-TR-0101, V1.0.0, https://ongoalliance.org/wp-content/uploads/2021/04/CBRSA-TR-0101-V1.0.0_Published-January-212019.pdf, Jan. 2019, 12 pages.

Wireless Broadband Alliance, "IMSI Privacy Protection for Wi-Fi," Technical Specification, Version 1.0, https://wballiance.com/wp-content/uploads/2021/02/IMSI-Privacy-Protection-for-Wi-Fi-Technical-Specification-v1.0-PMO.pdf, Jan. 2021, 25 pages.

Hughes Systique, "OpenRoaming—A Global Wi-Fi Roaming Enabler," Blog, https://hsc.com/Resources/Blog/OpenRoaming-A-Global-Wi-Fi-Roaming-Enabler, Jul. 2020, 7 pages.

(56) References Cited

OTHER PUBLICATIONS

OnGo, "CBRS Network Services Stage 2 and 3 Specification", CBRS Alliance, CBRSA-TS-1002, V3.1.0, Jun. 23, 2020, 55 pages.
Wi-Fi IMSI Privacy Protection Group, "IMSI Privacy Protection for Wi-Fi", Wireless Broadband Alliance (WBA), Version 1.0, Jan. 2021, 25 pages.
OnGo, "CBRS Network Services Stage 2 and 3 Specification", CBRS Alliance, CBRSA-TS-1002, V3.0.0, Feb. 18, 2020, 55 pages.
I3 Forum, "IMS-Based Services: Service Interoperability", International Interconnection Forum for Services over IP, Release 1.2, Jun. 2019, 35 pages.
"Official Document IR.67—DNS Guidelines for Service Providers and GRX and IPX Providers", GSM Association, Version 17.0, Nov. 10, 2020, 75 pages.
Tech-Invite, "Numbering, addressing and identification for the Evolved Packet Core (EPC)", inside TS 23.003: Identifiers for EPC, https://www.tech-invite.com/3m23/toc/tinv-3gpp-23-003_t.html, downloaded Jun. 3, 2021, 8 pages.
"IR.61 Wi-Fi Roaming Guidelines v11.0", GSM Association, Version 12.0, Sep. 27, 2017, 52 pages.
J. Arkko, et al., "Improved Extensible Authentication Protocol Method for 3rd Generation Authentication and Key Agreement (EAP-AKA')," Network Working Group, Request for Comments: 5448, Updates: 4187, Category: Informational, May 2009, 29 pages.
J. Arkko, et al., "Extensible Authentication Protocol Method for 3rd Generation Authentication and Key Agreement (EAP-AKA)," Network Working Group, Request for Comments:4187, Category: Informational, Jan. 2006, 79 pages.
3GPP, "3rd Generation Partnership Project; Technical Specification Group Core Network and Terminals; Numbering, addressing and identification; (Release 17)," 3GPP TS 23.003 V17.2.0, Jun. 2021, 144 pages.
"CBRS Alliance Indentifier Guidelines for Shared HNI," CBRS Alliance, CBRSA-TR-0100, V1.0.0, Nov. 27, 2018, 18 pages.
"EPS Roaming Guidelines," GSM Association, IR.88, Version 24.0, May 28, 2021, 108 pages.
"Telephone Network and ISDN Operation, Numbering, Routing and Mobile Service," International Telecommunication Union, Identification Plan for Land Mobile Stations, ITU-T Recommendation E.212, Jan. 18, 1999, 9 pages.
Mealling, "Dynamic Delegation Discovery System (DDDS) Part Three: The Domain Name System (DNS) Database," The Internet Society, Network Working Group, Request for Comments: 3403, Category: Standards Track, Oct. 2002, 14 pages.
Mealling, et al., "The Naming Authority Pointer (NAPTR) DNS Resource Record," The Internet Society, Network Working Group, Request for Comments: 2915, Category: Standards Track, Sep. 2000, 18 pages.

\* cited by examiner

136 Re-Write Rules

| | MCC/MNC | Identity Type | Re-write Rules |
|---|---|---|---|
| 136-1 | 315/010 | IMSI (1) | Recover first 4 digits and re-write realm between a sub-domain and MNC. (Opt. Insert "pub." before 3gppnetwork.org if operating in a private system architecture) |
| 136-2 | bbb/ccc | IMSI (1) | Recover last 9 digits and re-write reverse into realm before MNC. (Opt. Insert "pub." before 3gppnetwork.org if operating in a private system architecture) |
| 136-3 | aaa/bbb | IMSI (1) | Recover last 6 digits and re-write into realm before MNC. (Opt. Insert "pub." before 3gppnetwork.org if operating in a private system architecture) |
| 136-4 | ccc/ddd | IMSI (1) | Determine localdomain and sub-domain based on MNC and/or value of MSIN partition (Opt. Insert "pub." before 3gppnetwork.org if operating in a private system architecture) |
| 136-5 | ccc/ddd | GUTI (2) | Determine MMEGI within GUTI and re-write realm using MMEGI (Opt. Insert "pub." before 3gppnetwork.org if operating in a private system architecture) |

FIG. 1B

OPENROAMING FOR PRIVATE COMMUNICATION SYSTEMS

CROSS-REFERENCE TO RELATED APPLICATION

This application claims the benefit of priority under 35 U.S.C. § 119 to U.S. Provisional Patent Application Ser. No. 63/117,010, filed on Nov. 23, 2020, the disclosure of which application is hereby incorporated by reference in its entirety.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases and as access network resources are shared among multiple network providers, efficient management of communication resources becomes more critical. In particular, there are significant challenges in managing service discovery for wireless networking architectures in which network services may vary across different network providers.

BRIEF DESCRIPTION OF THE DRAWINGS

FIG. 1B is a diagram illustrating re-write rules for re-writing a realm of an identifier associated with a user device, according to various example embodiments.

DESCRIPTION OF EXAMPLE EMBODIMENTS

Overview

Figure 1A:
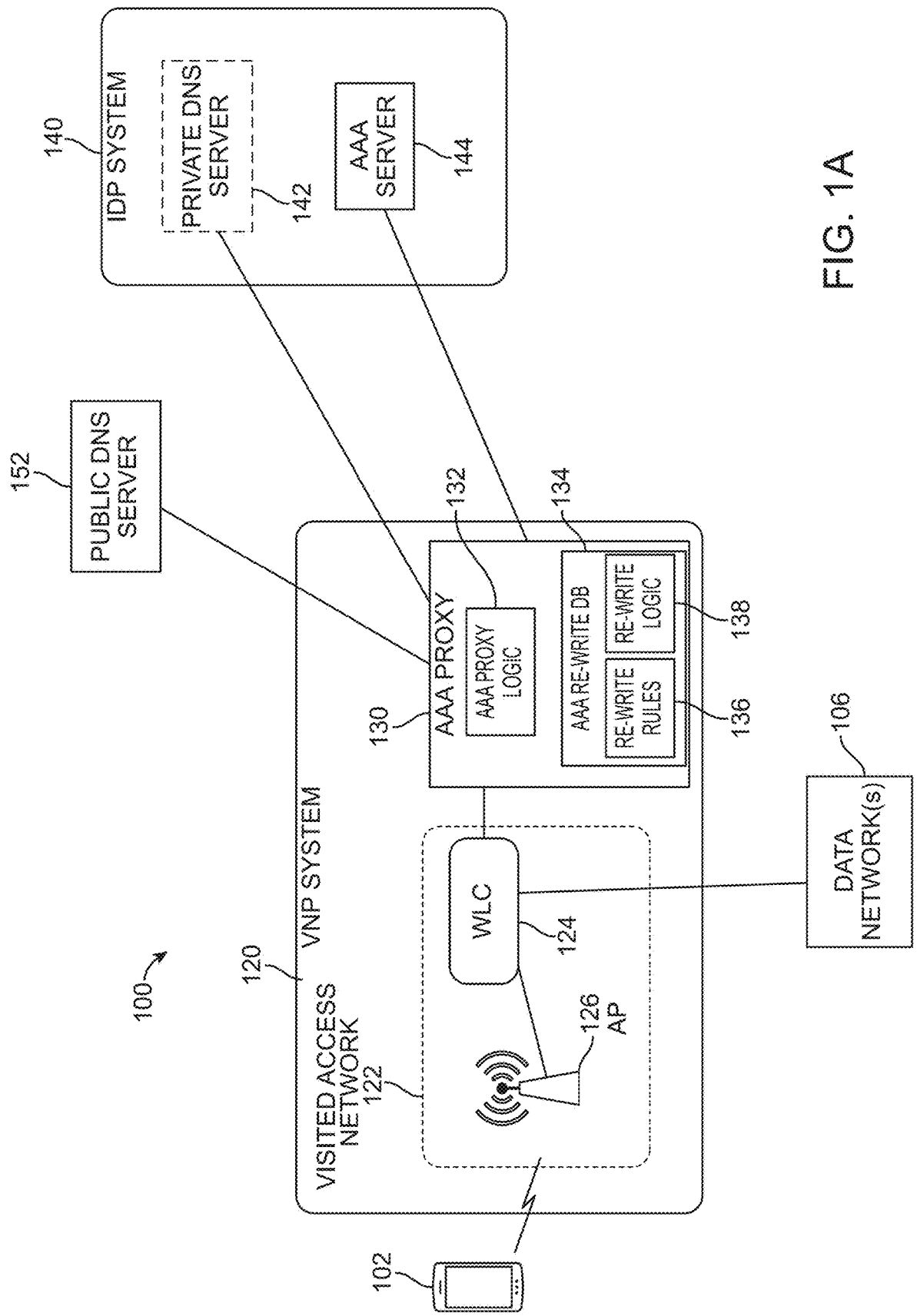
FIG. 1A is a block diagram of a system in which techniques that may facilitate re-writing a realm of an identifier associated with a user device attempting to access a visited access network in order to identify an authentication server for authenticating the user device, according to an example embodiment.

The OpenRoaming™ network architecture was conceived as a system built on an assumption of best effort, settlement free access. OpenRoaming uses Domain Name System (DNS)-based identification of identity providers (IDPs) using DNS Name Authority Pointer (NAPTR) records to identify an Authentication, Authorization and Accounting (AAA) service to authenticate a user device or user equipment (UE). The AAA service may be identified using a realm portion of an identifier (ID) associated with the user device. In Third Generation Partnership Program (3GPP) systems, user devices may be defined using International Mobile Subscriber Identities (IMSIs) including Mobile Country Codes (MCCs) and Mobile Network Codes (MNCs) allocated by the International Telecommunication Union and/or national numbering authorities. As per 3GPP Technical Specification (TS) 23.003, the realm portion of the ID is constructed using the MCC and the MNC of the IMSI.

The Citizens Broadband Radio Service (CBRS) Alliance enables operation of private systems, companies, or enterprises on a portion of the Long Term Evolution (LTE) spectrum allocated for general use. The CBRS Alliance has been allocated an MNC of 010 and operates under the MCC 315 (i.e., a country code associated with the United States). The MulteFire Alliance has been allocated an MCC of 902 (i.e., a code associated with a shared-country code as defined by the International Telecommunications Union) and an MNC of 001. Private enterprises that operate within a shared system (e.g., the CBRS alliance and/or Multefire alliance) utilize the same MCC and MNC that are assigned to the shared system (e.g., 315/010 for private enterprises/operators within the CBRS alliance and 902/001 for private enterprises/operators within the Multefire alliance). This arrangement has implications on the support of roaming by the shared systems. Specifically, it necessitates the operator of the shared home network identifier (e.g., CBRS alliance and/or Multefire alliance) to operate a converged signaling system on behalf of companies/enterprises/operators that are deploying identity systems used in the shared systems because all the realms being used are in the format mnc<sharedMNC>,mcc<sharedMCC>.3gppnetwork.org.

In some instances, it may be necessary to identify a private enterprise associated with a user device to authenticate the user device when the user device is accessing a visited access network. When the private enterprise is part of a shared system, identifying the private enterprise may not be possible using a conventional realm that includes the MCC and MNC. Since all enterprises within the shared system are allocated the same MCC and MNC (i.e., the MCC and MNC associated with the shared system), the conventional realm indicates that the private enterprise is part of the shared system, but does not indicate an identity of the private enterprise.

Techniques herein provide multiple features involving re-writing the realm to identify an enterprise or company, also referred to herein as an Identity Provider (IdP or IDP), within a shared service that is associated with a user device.

In one embodiment, a method is performed, which may include obtaining an access request for a device to access a visited access network, the access request including an authentication identifier for the device, and the authentication identifier including an identity for the device and a realm comprising a network identifying portion; determining a re-write rule for the realm by querying a database based on an identity type of the identity for the device and the network identifying portion of the realm, the database including a plurality of re-write rules for a plurality of networks and a plurality of identity types; re-writing the realm based on the re-write rule using the identity for the device to generate a re-written realm; obtaining, based on the re-written realm, an address for an authentication server of an identity provider associated with the device; and performing an authentication with the authentication server using the authentication identifier for the device to authenticate the device for the visited access network.

In one embodiment, the network identifying portion of the realm includes a network code and a country code and querying the database includes querying the database using the country code and the network code. At least one re-write rule included in the database may facilitate generating one or more re-written realms that are publicly resolvable. The identity associated with the device may be an International Mobile Subscriber Identity (IMSI) and re-writing the realm may include generating the re-written realm based on an IMSI block number (IBN) contained in the IMSI. A particular re-write rule may indicate where the IBN is contained within the IMSI and how the IBN is to be inserted in the re-written realm.

In one embodiment, the identity for the device may be a temporary identifier for the device. When the identity is a temporary identifier, the temporary identifier associated with the device may be a Globally Unique Temporary Identifier (GUTI) and re-writing the realm may include generating the re-written realm based on a Mobility Management Entity (MME) Group Identity (MMEGI) included in the GUTI.

Example Embodiments

The OpenRoaming architecture is a system that is based on dynamic discovery of RADIUS security (RadSec or RADSEC) peers to authenticate user devices when the user devices are attempting to access a visited access network. A cellular user device includes a Subscriber Identity Module (SIM) or an embedded SIM (eSIM) that stores an identifier associated with the user device. When the user device requires authentication, the realm/network identifying portion of the identifier of the user device is identified and used to perform a DNS lookup to discover a RadSec or AAA server to authenticate the user device. In some instances, three records can be used to identify the RadSec or AAA server—a NAPTR record, a service (SRV) record, and an A record. For example, a user who is authenticating using the identifier user@company.openroaming.net will query for the following records that lead to a resolution of a RadSec server at Internet Protocol (IP) address 3.208.239.144:

company.openroaming.net. 300 IN NAPTR 50 50 "s" "aaa+auth:radius.tls.tcp" " "_radiustls._tcp.company.openroaming.net.
_radiustls._tcp.company.openroaming.net. 300 IN SRV 0 10 2083 idp.openroaming.net.
idp.openroaming.net. 300 IN A 3.208.239.144.

In 3GPP systems, user devices may be identified using IMSIs. The realm portion may be constructed using the MCC and the MNC portions of the IMSI (e.g., "0<IMSI>@wlan.mnc<MNC>.mcc<MCC>.3gppnetwork.org" for EAP Authentication and Key Agreement (AKA) authentication). The Global System for Mobile Communications Association (GSMA) operates the 3gppnetwork.org domain and can delegate the operation of the mnc<MNC>.mcc<MCC> zone to each Public Land Mobile Network (PLMN) operator. For example, mnc015.mcc234.3gppnetwork.org is delegated to Vodafone UK. GSMA Official Document IR.88 defines how DNS NAPTR records may be used to recover the IP address of a server when roaming using the realm "epc.mnc<MNC>.mcc<MCC>.3gppnetwork.org."

For user devices associated with the CBRS alliance, the IMSI includes a shared home network identifier (i.e., the MCC is 315 and the MNC is 010) followed by a nine digit Mobile Subscriber Identification Number (MSIN) for each user device. The MSIN includes a four digit IMSI Block Number (IBN) associated with a private system or operator within the CBRS alliance followed by a five digit User Identification Number (UIN) associated with the user device. For example, an IMSI of 0315010123456789 indicates an MCC of 315, an MNC of 010, an IBN of 1234, and a UIN of 56789.

In one example, a network signaling system operating in a CBRS environment is operable to generate a realm, such as "sub-domain.ibn<IBN>.mnc<MNC>.mcc<MCC>.3gppnetwork.org," that is distinct from those previously generated. For example, the realm "sub-domain.ibn0345.mnc010.mcc315.3gppnetwork.org" may be generated in the CBRS environment and may have an IBN of 0345, which is allocated to a particular enterprise within the CBRS environment and a sub-domain of "wlan." The sub-domain corresponds to a value defined in 3GPP TS 23.003 (e.g., "wlan" or "epc") and indicates whether a connection is via Wi-Fi or via a Fourth Generation (4G) or Fifth Generation (5G) cellular connection.

The operator of the shared MCC/MNC may delegate operation of the DNS zone to the enterprise allocated the particular IMSI block number (in this example, "ibn0345"). In this way, the organization that has been allocated the shared MCC/MNC (in this example, the CBRS alliance) is not required to operate a single converged signaling system on behalf of all the enterprises implementing the shared technology, which allows the ability to support optimized roaming across shared deployments. Delegation of the operation of the signaling systems to the operator of the IMSI block number may result in improved scalability.

In other shared systems, the rules for partitioning of MSINs may be different than the rules for the CBRS alliance. For example, a flexible partitioning of MSINs may be desirable in order to ensure high utilization of the E.212 number range allocation. A policy for partitioning MSINs may be defined for a shared system associated with a particular MCC/MNC. In one example, the rules for partitioning the MSIN for a particular MCC/MNC (e.g., for 901/020) may define that the reverse MSIN is used within DNS queries. In this example, an IMSI of "901020123456789" may be used to generate a DNS request of "9.8.7.3.5.4.3.2.1.mnc020.mcc901.3gppnetwork.org."

Equivalent CBRS capability may be achieved by delegating the "4.3.2.1.mnc020.mcc901.3gppnetwork.org" zone to the operator of the IMSI block number/partition 1234. This operator is able to assign 99,999 identities to their devices. Using the same embodiment, an IMSI of "901020987654321" may be allocated to an operator with a small number of anticipated devices. In this scenario, "4.5.6.7.8.9.mnc020.mcc901.3gppnetwork.org" may be allocated to the operator of a block of IMSIs that, in this instance, is able to allocate only 999 device identities.

In other embodiments, in addition to or instead of using IMSIs, user devices may be identified using temporary identifiers. For example, a Globally Unique Temporary UE Identity (GUTI) provides an identification of the UE that does not reveal the UE or the user's permanent identity. The GUTI allows an identification of the Mobility Management Entity (MME) that allocated the GUTI and the network in which the MME resides and may be used by the network and the UE to establish the UE's identity during signaling. The GUTI consists of an MME-Temporary Mobile Subscriber Identity (M-TMSI) that uniquely identifies the UE within the MME that allocated the GUTI and a Globally Unique MME Identifier (GUMMEI) that is constructed from the MCC/

MNC (e.g., 315/010 for the CBRS alliance or 902/001 for the Multefire alliance) and the MME Identifier (MMEI) of the MME that allocated the GUTI. The MMEI is additionally constructed from an MME Group Identity (MMEGI) and an MME Code (MMEC).

Implementations described herein allow the delegation of the operation of the signaling systems to the operator of the IBN (i.e., when the user device is identified using an IMSI) or the MMEGI (i.e., when the user device is identified using a GUTI). According to implementations described herein, the realm may be generated based on the IBN or the MMEGI to identify a AAA or RadSec server for authenticating a user device when the user device is attempting to access a visited access network. According to implementations described herein, a lookup may be performed in a database to determine rules for re-writing the realm based on the identifier of the user device. For example, rules for identifying the IBN or the MMEGI within an IMSI or a GUTI may differ based on the shared system identified by the MCC/MNC pair in an identifier associated with the user device (i.e., the IMSI or GUTI). The database may store records that indicate how to identify the IBN or the MMEGI based on the MCC/MNC pair of the shared system associated with the user device.

In addition, implementations described herein allow for operation in conjunction with a public DNS. For example, the database may enable the configuration of a realm that is publicly resolvable according to GSMA PRD IR.67. In other words, as further described below, the database may indicate that if the database is operating within a private system architecture (e.g., if VNP system 120 is operated as a private system), the realm may be re-written to be publicly resolvable.

Referring to FIG. 1A, FIG. 1A is a block diagram of a system 100 in which techniques that facilitate delegation of the operation of signaling systems to an operator of an identity system used in a shared system may be implemented, according to an example embodiment. In at least one embodiment, system 100 may include a user equipment (UE) 102, one or more data network(s) 106, a Visited Network Provider (VNP) system 120, one or more Identity Provider (IDP) System 140, and one or more Public Domain Name System (DNS) Servers 152. VNP system 120 may be referred to herein interchangeably as VNP 120. IDP System 140 may be referred to herein interchangeably as IDP 140.

The VNP system 120 may include a visited access network 122, which may further include a wireless local area network controller (WLC) 124 and a wireless local area network (WLAN) access point (AP) 126. WLAN AP 126 may be referred to herein interchangeably as AP 126. VNP system 120 may also include an Authentication, Authorization and Accounting (AAA) proxy 130 (or multiple AAA proxies). The AAA proxy 130 may proxy signaling between one or more client(s) and server(s). AAA proxy 130 may include AAA proxy logic 132 and a AAA re-write database (DB) 134. AAA re-write DB 134 may include re-write rules 136 and re-write logic 138.

As further described below with respect to FIGS. 2 and 3, AAA proxy logic 132 may receive an identifier for a UE, such as an Extensible Authentication Protocol (EAP)-Identifier (ID) corresponding to the UE (e.g., UE 102), and may perform a lookup in AAA re-write DB 134 to determine rules for re-writing a realm associated with the EAP-ID. Re-write logic 138 may determine a type of EAP-ID received (e.g., an IMSI, a GUTI, etc.) and the lookup may be performed in the re-write rules 136 based on the type of EAP-ID received. Re-write logic 138 may determine the identity type based on, for example, a format of the identity/identifier.

The IDP system 140 may be considered a first domain associated with a first realm and may include a private DNS server 142 and a AAA server 144. Although one VNP, one public DNS server, and one IDP are illustrated in FIG. 1A, it is to be understood that any number of VNPs, public DNS servers, and IDPs may be present in system 100; the number of VNP/public DNS servers/IDPs is provided for illustrative purposes only.

Generally, AP 126 may interface with WLC 124, which may further interface with external data network(s) 106. WLC 124 may also interface with public DNS server 152 and IDP 140 (e.g., AAA server 144 and private DNS server 142, if implemented) via AAA proxy 130.

UE 102 may be associated with any electronic device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. UE 102 discussed herein may also be inclusive of a suitable interface to a human user such as a microphone, a display, a keyboard, or other terminal equipment. UE 102 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein. UE 102 may be configured with hardware (e.g., communications units, receiver(s), transmitter(s), antenna(s) and/or antenna arrays, processor(s), memory element(s), baseband processor(s) (modems), etc.), software, logic, and/or the like (e.g., a wireless wide area network (WWAN) (e.g., cellular) communications unit, a WLAN (e.g., Wi-Fi®), etc.) to facilitate over-the-air Radio Frequency (RF) connections with any combination of access networks, such as a WLAN facilitated via WLAN AP 126.

AP 126 may include any combination of hardware (e.g., communications units, receiver(s), transmitter(s), antenna(s) and/or antenna array(s), processor(s), memory element(s), baseband processor(s) (modems), etc.), controllers, software, logic, and/or the like to facilitate over-the-air RF WLAN connections (e.g., Wi-Fi® connections) with one or more devices, such as UE 102).

Generally, WLC 124 may provide/be responsible for wireless LAN functions such as, WLAN-based access authentication services, authorization services, intrusion prevention, RF management, and/or the like in which various authentication/authorization services may be performed. AAA server 144 for IDP 140 may also facilitate authentication/authorization services. Generally, authentication refers to a process in which an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of restrictions, for example time-of-day restrictions, or physical location restrictions, or restrictions against multiple accesses by the same entity or user/device.

Generally, a DNS server, such as public DNS server 152 and private DNS server 142 may provide lookup services for system resources (e.g., hosts, services, functions, etc.) to provide resource records for various DNS queries. In some instances, resource records may include "A" and "AAAA" resource records in an which an 'A' record may define an IP version 4 (IPv4) host address and an "AAAA" resource record may define an IP version 6 (Ipv6) host address. Resource records may also include NAPTR resource records, as defined according to Internet Engineering Task Force (IETF) Request For Comments (RFC) 3403.

Consider an operational example involving UE 102 in which an EAP Exchange is performed between UE 102 and an application endpoint, such as AAA server 144, for authenticating UE 102 to connect to a WLAN provided via AP 126 in VNP 120 when UE 102 is roaming. For the EAP-Exchange, UE 102 may communicate an EAP-ID response to the AP 126 that includes an identity for UE 102 formatted per 3GPP TS 23.003 and IETF RFC 4187/5448, such as "0315010123456789@wlan.mnc010.mcc315.3gppnetwork.org." In this example, the identity for UE 102 includes an IMSI with an MCC of 315 and an MNC of 010, which corresponds to the CBRS alliance. Because the companies/enterprises (e.g., IDPs) that deploy identity systems used within the CBRS alliance share an MCC of 315 and an MNC of 010, constructing a realm using the MCC and the MNC will not lead to a resolution of a RadSec/AAA server corresponding to a company or operator (e.g., the IDP) associated with the user device. Therefore, according to implementations herein, the realm, "wlan.mnc010.mcc315.3gppnetwork.org" in this example, may be re-written to identify an enterprise to authenticate the user device using, in this example, the IBN associated with the enterprise.

As discussed above, different operators, alliances, companies, and/or systems may have different rules or methods for partitioning MSINs. A method in which the realm is re-written can be based on a rule associated with a particular shared system (identified by a particular MCC/MNC pair). For example, an identifier associated with the enterprise/IDP to authenticate UE 102 may be contained in different locations within the MSIN or may be of different lengths based on the MCC/MNC pair of the shared system associated with the enterprise. To determine how to re-write the realm, a re-write rule may be determined based on a type of the identifier associated with the UE and based on an MCC/MNC pair identified from the UE identifier and/or realm.

To identify the re-write rule associated with the UE identifier, AP 126 may transmit a RADIUS access request including the identifier (e.g., the username/EAP-ID) associated with UE 102 to AAA proxy 130. In this example, the EAP-ID includes an IMSI associated with UE 102. AAA proxy 130 may receive the RADIUS access request and query AAA re-write DB 134 to determine the re-write rule for re-writing the realm associated with the identifier. Re-write logic 138 may determine a type of the identifier (e.g., IMSI, GUTI, etc.) and whether the realm should be re-written to be publicly resolvable. For example, "pub." may be inserted before 3gppnetwork.org when re-writing the realm if AAA proxy 130 is operating in a private system architecture (e.g., if VNP system 120 is implemented as a private/enterprise system). The lookup may be performed in re-write rules 136 based on the type of the identifier. Re-write rules 136 contain information on the formatting of UE identifiers (e.g., IMSIs, GUTIs, etc.) when operating with a shared country/network code.

Referring to FIG. 1B, FIG. 1B illustrates exemplary re-write rules 136 for shared country and network codes, according to an example embodiment. Re-write rules 136 include re-write rules 136-1 to 136-5 and each re-write rule is associated with an MCC/MNC pair and an identity type. The re-write rules indicate how to re-write the realm based on the MCC/MNC pair and the identity type associated with the identifier of the UE. In the example discussed above, the MCC/MNC pair is 315/010 and the identifier type is IMSI (or type 1). Therefore, as shown by 136-1, the re-write rule associated with 315/010 and IMSI (1) indicates that the realm should be re-written by recovering the first four digits of the MSIN and re-writing the realm by inserting the first four digits between a sub-domain and the MNC.

As illustrated in FIG. 1B, different re-write rules exist for different MCC/MNC pairs and identity types. For example, re-write rule 136-2 indicates that, for MCC/MNC pair bbb/ccc with an identity type IMSI (or type 1), the realm should be re-written by recovering the last 9 digits from the identity and re-writing the 9 digits in reverse before the MNC. As another example, re-write rule 136-3 indicates that, for MCC/MNC pair aaa/bbb with an identity type IMSI (or type 1), the realm should be re-written by recovering the last 6 digits of the identity and re-writing the last 6 digits into the realm before the MNC. The re-write rules further indicate that optionally, "pub." is inserted before 3gppnetwork.org if operating in a private system architecture. The letters representing the MCC/MNC pairs in FIG. 1B represent numbers and are for example only. Additionally, the same letter may correspond to more than one number. For example, ccc/ddd may correspond to 901/020.

In one example, re-write rules 136 may include an entry that identifies the use of a shared IMSI (e.g., using MNC=999). In one example, a network signaling system operating in a private environment is operable to generate a realm that is distinct from those previously defined, such as "sub-domain.localdomain.org." The localdomain and/or sub-domain may be selected based on the value of the MNC and/or the value of the MSIN partition. For example, re-write rule 136-4 indicates that, for MCC/MNC pair ccc/ddd with identity type IMSI (1), the localdomain and subdomain are to be determined based on the MNC and/or value of the MSIN partition.

As shown in 136-5, for the same MCC/MNC pair ccc/ddd, but for identity type GUTI (2) which comprises the elements <MCC>, <MNC>, <MME Group ID>, <MME Code> and <M Temporary Mobile Subscriber Identity>, the MME Group ID (MMEGI) within the GUTI is determined and the realm is re-written using the MMEGI. For example, AAA proxy logic 132 may receive a RADIUS access request from a UE with a user name corresponding to a GUTI and a destination realm of the form "epc.mnc010mcc315.3gppnetwork.org." Based on re-write rule 136-5, the MMEGI is determined from the GUTI and the realm is re-written using the MMEGI. In this scenario, assume that "65536" is the decimal representation of the 16 bit MMEGI allocated by the CBRS alliance to an organization that has been allocated a corresponding IMSI block number. For this example, further assume that AAA proxy logic 132 is operating in a private system architecture. In this example, the realm is re-written as "epc.mmegi65536.mnc410mcc310.pub.3gppnetwork.org."

Returning to FIG. 1A, AAA proxy 130 may re-write the realm based on the re-write rule identified from re-write rules 136. In the example discussed above, the MSIN associated with UE 102 is "123456789" and the realm is "wlan.mnc010.mcc315.3gppnetwork.org." Therefore, according to rule 136-1, the digits "1234" (i.e., the first four digits of the MSIN) are recovered. In this example, "1234" is the MN associated with the enterprise in the CBRS alliance associated with UE 102. To re-write the realm, "1234" is inserted between the sub-domain (in this example "wlan.") and the MNC (in this example '010'). Therefore, in this example, if AAA proxy 130 is not operating in a private system architecture, AAA proxy 130 may re-write the realm to "wlan.ibn1234.mnc010.mcc315.3gppnetwork.org."

As illustrated in re-write rules 136, optionally, "pub." may be inserted before 3gppnetwork.org for the re-written zone to be publicly resolvable when AAA proxy 130 is operating in a private system architecture. For example, if AAA proxy 130 is operating in a private system architecture, the mapping rules may be used to generate the realm "subdomain.ibn<IBN>.mnc<MNC>.mcc<MCC>.pub.3gppnetwork.org" where the delegated zone mnc<MNC>.mcc<MCC>.pub.3gppnetwork.org is publicly resolvable. In this case, if AAA proxy 130 is operating in a private system architecture, AAA proxy 130 may re-write the realm to 'wlan.ibn1234.mnc010.mcc315.pub.3gppnetwork.org' so the delegated zone is publicly resolvable.

When AAA proxy 130 has re-written the realm, AAA proxy 130 may transmit a DNS query to a DNS server (e.g., public DNS server 152 or private DNS server 142) including the re-written realm to determine an 'A' record of IDP 140 associated with the operator to authenticate UE 102. In this example, IDP 140 operates IBN 1234. AAA proxy 130 may transmit a RADIUS access request including the EAP-ID of UE 102 to AAA server 144 to authenticate UE 102.

In this way, implementations described herein can signal operators of an IMSI block number or a MMEGI with an authentication exchange to enable dynamic peer discovery and authentication within a shared system environment.

Figure 2:
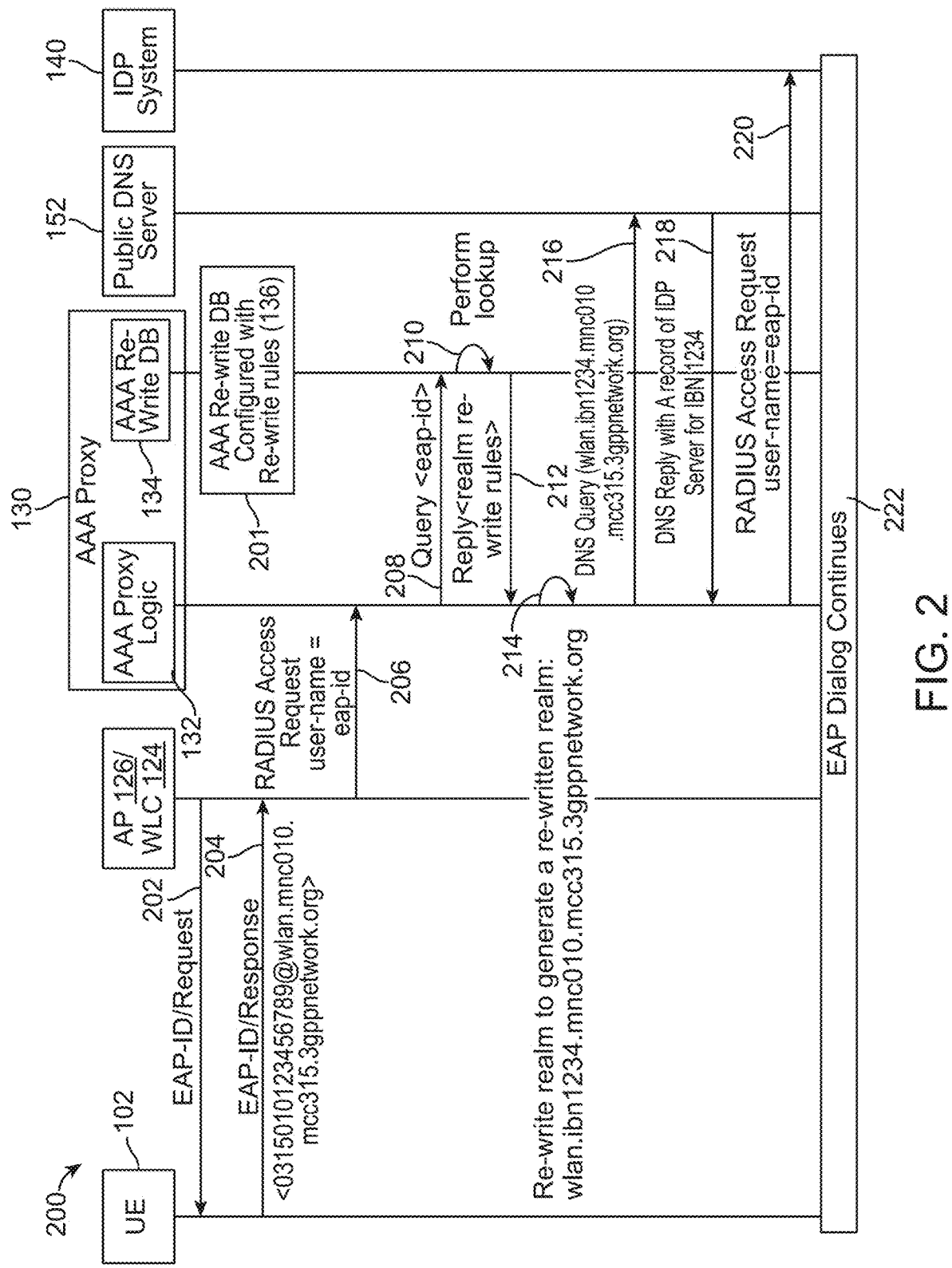
FIG. 2 is message sequence diagram illustrating a call flow associated with re-writing a realm of a user device for identifying an authentication server for authenticating the user device, according to an example embodiment.

FIG. 2 is a message sequence diagram illustrating a call flow 200 that illustrates an example in which a realm is re-written based on performing a lookup in re-write rules 136 using an identifier associated with a user device. In at least one embodiment, call flow 200 illustrates example operations that may be performed, at least in part, by UE 102, AP 126/WLC 124, AAA proxy logic 132, AAA re-write DB 134, public DNS server 152, and IDP system 140. Various operations for FIG. 2 may be discussed with reference to call flow 200 and particular communications may be omitted for purposes of brevity.

In the example illustrated at FIG. 2, UE 102 is a CBRS device with a CBRS SIM card attempting to access visited access network 122 (not shown in FIG. 2) by authenticating onto Wi-Fi at AP 126 or WLC 124. For the embodiment of FIG. 2, consider, as shown at 201, that AAA re-write DB 134 is configured with re-write rules, for example re-write rules 136 as shown in FIG. 1B. At 202, AP 126/WLC 124 may transmit an EAP-ID request to UE 102 requesting an EAP-ID associated with UE 102. At 204, UE 102 may respond with an EAP-ID (e.g., the authentication identifier for UE 102). In this example, UE 102 may respond by transmitting the EAP-ID "0315010123456789@wlan.mnc010.mcc315.3gppnetwork.org" to AP 126/WLC 124 in which the EAP-ID includes the identity for the UE 102 (in this example, the IMSI "0315010123456789) and a realm that includes a network identifying portion, such as an MNC and MCC (in this example, "wlan.mnc010.mcc315.3gppnetwork.org"). In this example, the EAP-ID for UE 102 indicates the MCC/MNC of 315/010, which identifies UE 102 as a device associated with an enterprise affiliated with the CBRS alliance. In this example, the realm of the EAP-ID further includes the sub-domain "wlan" indicating a Wi-Fi authentication attempt.

At 206, AP 126/WLC 124 may transmit a RADIUS access request to AAA proxy logic 132 including the authentication identifier for UE 102, such as the username/EAP-ID for UE 102 in this example. At 208, AAA proxy logic 132 may transmit a query including the EAP-ID to AAA re-write DB 134. AAA re-write DB 134 is configured with re-write rules 136, as discussed above with respect to FIG. 1B. Re-write logic 138 (not illustrated in FIG. 2) may determine an identity type of the identity for UE 102 included in the EAP-ID. In this example, the EAP-ID includes an IMSI. However, in other implementations the EAP-ID may include a GUTI or another type of identifier/identity type for a device.

At 210, a lookup may be performed to identify a re-write rule for re-writing the realm. Based on the MCC/MNC and the type of the identifier, a re-write rule for re-writing the realm is identified from the re-write rules 136 (not shown in FIG. 2). In this example, re-write rule 136-1 of FIG. 1B is identified for the MCC/MNC of 315/010 and the identifier type IMSI (1). At 212, AAA re-write DB 134 may transmit the re-write rule (e.g., re-write rule 136-1) to AAA proxy logic 132.

At 214, AAA proxy logic 132 may re-write the realm based on the identified re-write rule to generate a re-written realm. In this example, the re-write rule indicates that the first four digits of the MSIN (e.g., "1234") are to be recovered and re-written between the sub-domain (e.g., "wlan") and the MNC (e.g., 010). Based on the re-write rule, the realm is re-written to generate the re-written realm: "wlan.ibn1234.mnc010.mcc315.3gppnetwork.org." If AAA proxy 130 is operating in a private system architecture (e.g., of VNP system 120 is operated as a private enterprise system), "pub." may additionally be inserted before "3gppnetwork.org" in the re-written realm. In the example given with respect to FIG. 2, AAA proxy 130 is not operating in a private system architecture and, thus, "pub." is not inserted in the re-written realm.

At 216, AAA proxy logic 132 may transmit a DNS Query to a DNS server (e.g., public DNS server 152) to determine the IP address of the enterprise to perform authentication of UE 102. The DNS query includes the re-written realm. At 218, public DNS server 152 transmits a DNS reply with the 'A' record of the IDP server for IBN 1234. Although not illustrated in FIG. 2 for the sake of brevity, communications between AAA proxy logic 132 and public DNS server 152 include NAPTR, SRV, and A queries and replies to determine the IP address associated with IDP system 140. For example, operations at 216 and 218 may include AAA proxy logic 132 transmitting a NAPTR query to DNS server 152 and AAA proxy logic 132 may receive a NAPTR reply from DNS server 152 including a service tag "aaa+auth." AAA proxy logic 132 may perform a DNS SRV lookup on the "aaa+auth" service record to identify the IDP server for IBN 1234, which is then looked-up again using an 'A' request to identify the IP address of the IDP system 140 (e.g., AAA server 144 within IDP system 140).

At 220, after obtaining the IP address of IDP system 140, AAA proxy logic 132 may transmit a RADIUS access request to IDP system 140 (e.g., AAA server 144 of IDP system 140) including the username/EAP-ID of UE 102 to authenticate UE 102. At 222, the EAP dialog continues, e.g., following the procedures defined in IETF RFC 4187/5448, and IDP system 140 may authenticate UE 102.

Figure 3:
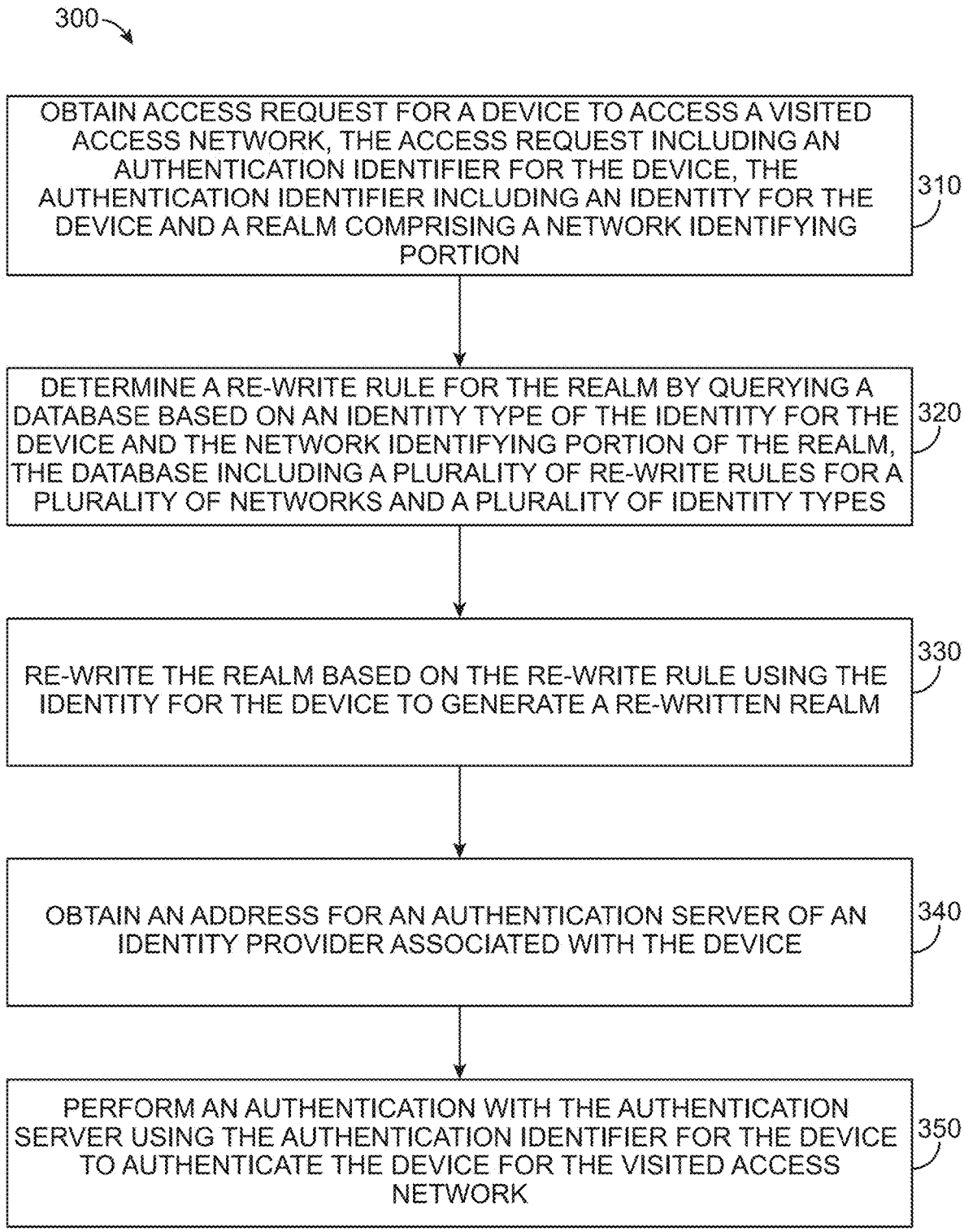
FIG. 3 is a flow chart depicting a method of re-writing a realm of an identifier associated with a user device for identifying an authentication server to authenticate the user device, according to an example embodiment.

Referring to FIG. 3, FIG. 3 is a flow chart depicting a method 300 according to an example embodiment. In particular, method 300 illustrates example operations that may be performed, at least in part, by an AAA proxy, such as AAA proxy 130, in order to re-write a realm of a user device to determine an authentication server for authenticating the user device, as discussed for various techniques presented herein.

At 310, an access request may be obtained for a device to access a visited access network. The access request may include an authentication identifier for the device in which the authentication identifier may include an identity for the device and a realm comprising a network identifying portion. For example, UE 102 may attempt to access a visited access network (e.g., visited access network 122) and AAA proxy 130/AAA proxy logic 132 may obtain an authentication identifier (e.g., an IMSI, a GUTI, etc.) associated with UE 102 when UE 102 attempts to access the visited access network 122.

At 320, a re-write rule for the realm is determined by querying a database based on an identity type of the identity for the device and the network identifying portion. The database includes a plurality of re-write rules for a plurality of networks and a plurality of identity types. For example, AAA proxy logic 132 may query the re-write rules 136 in AAA re-write DB 134 to determine a rule for re-writing the realm. The re-write rules 136 may be queried using the type of the identifier and the MCC and MNC associated with the realm of the identifier.

At 330, the realm may be re-written based on the re-write rule to generate a re-written realm. For example, AAA proxy 130 may re-write the realm associated with the identifier based on the re-write rule determined from the re-write rules 136 to generate the re-written realm.

At 340, an address may be obtained for an authentication server of an identity provider associated with the device. For example, AAA proxy 130 may transmit the re-written realm to a DNS server (e.g., public DNS server 152 or private DNS server 142) to determine an IP address associated with an authentication server of an identity provider associated with the device.

At 350, an authentication may be performed with the authentication server to authenticate the device for the visited access network. For example, AAA proxy 130 may transmit the identifier of the device to the address associated with the authentication server to authenticate the device. When the device is authenticated, the device may access the visited access network.

Figure 4:
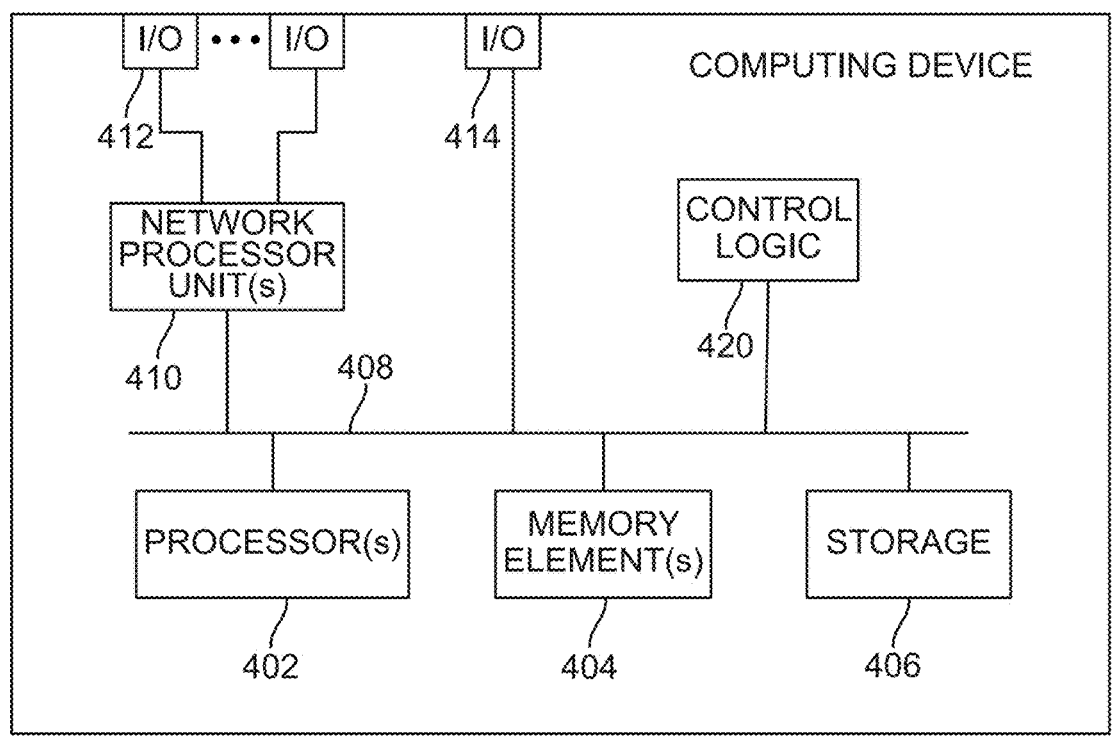
FIG. 4 is a hardware block diagram of a computing device that may perform functions associated with any combination of operations, in connection with the techniques discussed herein.

Referring to FIG. 4, FIG. 4 illustrates a hardware block diagram of a computing device 400 that may perform functions associated with operations discussed herein in connection with the techniques depicted in FIGS. 1A, 1B, 2, and 3. In various embodiments, a computing device, such as computing device 400 or any combination of computing devices 400, may be configured as any elements/devices/ nodes as discussed for the techniques depicted in connection with FIGS. 1A, 1B, 2, and 3, such as AAA proxy logic 132 and re-write logic 138 of AAA proxy 130, private DNS server 142, AAA server 144, public DNS server 152, UE 102, etc. as shown in FIG. 1A.

It should be appreciated that FIG. 4 provides only an illustration of one embodiment and does not imply any limitations with regard to the environments in which different embodiments may be implemented. Many modifications to the depicted environment may be made.

In at least one embodiment, computing device 400 may be any apparatus that may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device. Processor(s) 402 (e.g., hardware processor(s)) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communications (e.g., wired and/or wireless communications) between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/ modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) and/or antennas/antenna arrays now known or hereafter developed. Thus, the network processor unit(s) 410 and/or network I/O interface(s) 412 may include any suitable interfaces for receiving, transmitting, and/or otherwise communicating (in a wired and/or wireless manner) data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation in which computing device 400 is implemented as the AAA proxy 130 of FIGS. 1A, 2, and 3, control logic 420 can include instructions that, when executed, cause processor(s) 402 to perform operations including obtaining an access request for a device to access a visited access network, wherein the access request includes an authentication identifier for the device, and wherein the authentication identifier includes an identity for the device and a realm comprising a network identifying portion; determining a re-write rule for the realm by querying a database based on an identity type of the identity for the device and the network identifying portion of the realm, wherein the database includes a plurality of re-write rules for a plurality of networks and a plurality of identity types; re-writing the realm based on the re-write rule using the identity for the device to generate a re-written realm; obtaining, based on the re-written realm, an address for an authentication server of an identity provider associated with the device; and performing an authentication with the authentication server using the authentication identifier for the device to authenticate the device for the visited access network.

Figure 5:
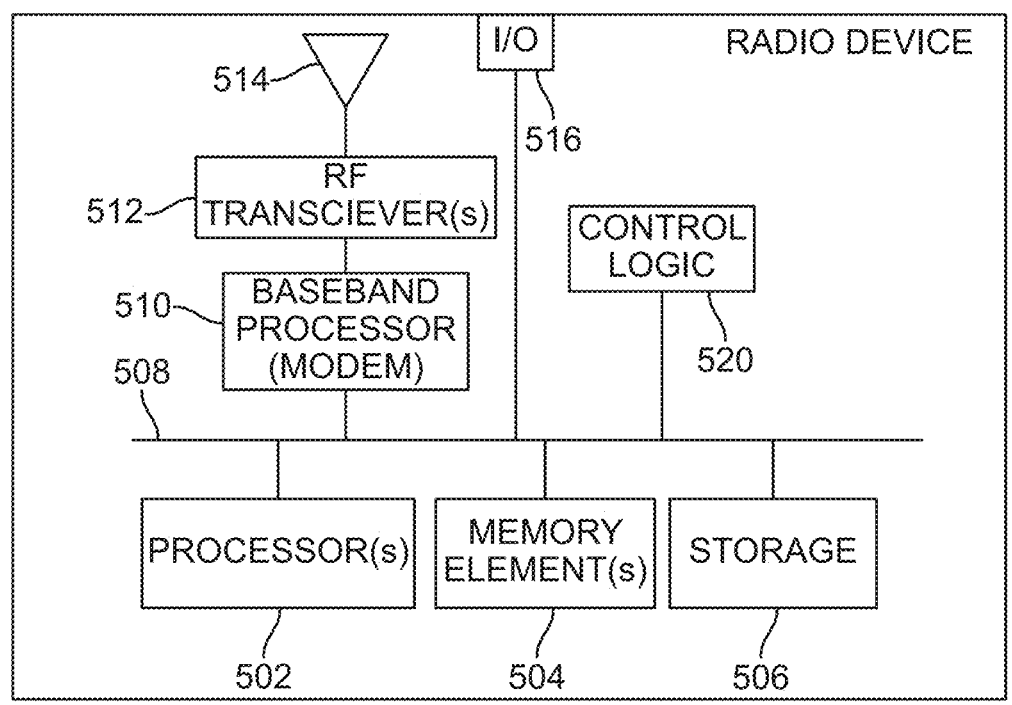
FIG. 5 is a hardware block diagram of a radio device that may perform functions associated with any combination of operations, in connection with the techniques discussed herein.

Referring to FIG. 5, FIG. 5 illustrates a hardware block diagram of a radio device 500 that may perform functions associated with operations discussed herein. In various embodiments, a user equipment or apparatus, such as radio device 500 or any combination of radio device 500, may be configured as any radio node/nodes as depicted herein in order to perform operations of the various techniques discussed herein, such as operations that may be performed by any of a user device, such as UE 102 and/or Wi-Fi AP 126.

In at least one embodiment, radio device 500 may be any apparatus that may include one or more processor(s) 502, one or more memory element(s) 504, storage 506, a bus 508, a baseband processor or modem 510, one or more radio RF transceiver(s) 512, one or more antennas or antenna arrays 514, one or more I/O interface(s) 516, and control logic 520.

The one or more processor(s) 502, one or more memory element(s) 504, storage 506, bus 508, and I/O interface(s) 516 may be configured/implemented in any manner described herein, such as described herein at least with reference to FIG. 5.

The RF transceiver(s) 512 may perform RF transmission and RF reception of wireless signals via antenna(s)/antenna array(s) 514, and the baseband processor (modem) 510 performs baseband modulation and demodulation, etc. associated with such signals to enable wireless communications for radio device 500.

In various embodiments, control logic 520, can include instructions that, when executed, cause processor(s) 502 to perform operations, which can include, but not be limited to, providing overall control operations of radio device 500; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420/520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404/504 and/or storage 406/506 can store data, software, code, instructions (e.g., processor instructions), logic, parameters, combinations thereof, and/or the like used for operations described herein. This includes memory element(s) 404/504 and/or storage 406/506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method is provided that may include obtaining an access request for a device to access a visited access network, wherein the access request includes an authentication identifier for the device, and wherein the authentication identifier includes an identity for the device and a realm comprising a network identifying portion; determining a re-write rule for the realm by querying a database based on an identity type of the identity for the device and the network identifying portion of the realm, wherein the database includes a plurality of re-write rules for a plurality of networks and a plurality of identity types; re-writing the realm based on the re-write rule using the identity for the device to generate a re-written realm; obtaining, based on the re-written realm, an address for an authentication server of an identity provider associated with the device; and performing an authentication with the authentication server using the authentication identifier for the device to authenticate the device for the visited access network.

In one example, the network identifying portion of the realm includes a network code and a country code and querying the database may include querying the database using the country code and the network code associated with the realm. In another example, at least one re-write rule included in the database facilitates generating one or more re-written realms that are publicly resolvable. In another example, the identity for the device is an International Mobile Subscriber Identity (IMSI) and re-writing the realm includes generating the re-written realm based on an IMSI block number (IBN) contained in the IMSI. In another example, a particular re-write rule indicates where the IBN is contained within the IMSI and how the IBN is to be inserted into the re-written realm. In another example, the identity for the device is a temporary identifier for the device. In another example, the temporary identifier for the device is a Globally Unique Temporary Identifier (GUTI) and re-writing the realm includes generating the re-written realm based on a Mobility Management Entity (MME) Group Identity (MMEGI) included in the GUTI.

In another form, a system is provided that includes at least one memory element for storing data; and at least one processor for executing instructions associated with the data, wherein executing the instructions causes the system to perform operations, comprising: obtaining an access request for a device to access a visited access network, wherein the access request includes an authentication identifier for the device, and wherein the authentication identifier includes an identity for the device and a realm comprising a network identifying portion; determining a re-write rule for the realm by querying a database based on an identity type of the identity for the device and the network identifying portion of the realm, wherein the database includes a plurality of re-write rules for a plurality of networks and a plurality of identity types; re-writing the realm based on the re-write rule using the identity for the device to generate a re-written realm; obtaining, based on the re-written realm, an address for an authentication server of an identity provider associated with the device; and performing an authentication with the authentication server using the authentication identifier for the device to authenticate the device for the visited access network.

In still another form, one or more non-transitory computer-readable storage media encoded with instructions are provided that, when executed by a processor, cause the processor to perform operations, comprising: obtaining an access request for a device to access a visited access network, wherein the access request includes an authentication identifier for the device, and wherein the authentication identifier includes an identity for the device and a realm comprising a network identifying portion; determining a re-write rule for the realm by querying a database based on an identity type of the identity for the device and the network identifying portion of the realm, wherein the database includes a plurality of re-write rules for a plurality of networks and a plurality of identity types; re-writing the realm based on the re-write rule using the identity for the device to generate a re-written realm; obtaining, based on the re-written realm, an address for an authentication server of an identity provider associated with the device; and performing an authentication with the authentication server using the authentication identifier for the device to authenticate the device for the visited access network.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining an access request for a device to access a visited access network, wherein the access request includes an authentication identifier for the device, and wherein the authentication identifier includes an identity for the device and a realm comprising a network identifying portion;
determining a re-write rule for the realm by querying a database based on an identity type of the identity for the device and the network identifying portion of the realm, wherein the database includes a plurality of entries, each entry including a particular network code, a particular country code, a particular identity type, and a particular re-write rule for re-writing a realm for a particular device associated with the particular network code, the particular country code, and the particular identity type;

re-writing the realm based on the re-write rule using the identity for the device to generate a re-written realm;

obtaining, based on the re-written realm, an address for an authentication server of an identity provider associated with the device; and performing an authentication with the authentication server using the authentication identifier for the device to authenticate the device for the visited access network.

2. The method of claim 1, wherein the network identifying portion of the realm includes a network code and a country code and querying the database includes querying the database using the country code and the network code.

3. The method of claim 1, wherein at least one re-write rule included in the database facilitates generating one or more re-written realms that are publicly resolvable.

4. The method of claim 1, wherein the identity for the device is an International Mobile Subscriber Identity (IMSI) and wherein re-writing the realm includes generating the re-written realm based on an IMSI block number (IBN) contained in the IMSI.

5. The method of claim 4, wherein a particular re-write rule indicates where the IBN is contained within the IMSI and how the IBN is to be inserted into the re-written realm.

6. The method of claim 1, wherein the identity for the device is a temporary identifier for the device.

7. The method of claim 6, wherein the temporary identifier for the device is a Globally Unique Temporary Identifier (GUTI) and wherein re-writing the realm includes generating the re-written realm based on a Mobility Management Entity (MME) Group Identity (MMEGI) included in the GUTI.

8. A system comprising:
at least one memory element for storing data; and
at least one processor for executing instructions associated with the data, wherein executing the instructions causes the system to perform operations, comprising:
obtaining an access request for a device to access a visited access network, wherein the access request includes an authentication identifier for the device, and wherein the authentication identifier includes an identity for the device and a realm comprising a network identifying portion;
determining a re-write rule for the realm by querying a database based on an identity type of the identity for the device and the network identifying portion of the realm, wherein the database includes a plurality of entries, each entry including a particular network code, a particular country code, a particular identity type, and a particular re-write rule for re-writing a realm for a particular device associated with the particular network code, the particular country code, and the particular identity type;
re-writing the realm based on the re-write rule using the identity for the device to generate a re-written realm;
obtaining, based on the re-written realm, an address for an authentication server of an identity provider associated with the device; and
performing an authentication with the authentication server using the authentication identifier for the device to authenticate the device for the visited access network.

9. The system of claim 8, wherein the network identifying portion of the realm includes a network code and a country code and wherein executing the instructions to query the database further causes the system to perform operations comprising:
querying the database using the country code and the network code.

10. The system of claim 8, wherein at least one re-write rule included in the database facilitates generating one or more re-written realms that are publicly resolvable.

11. The system of claim 8, wherein the identity for the device is an International Mobile Subscriber Identity (IMSI) and wherein re-writing the realm includes generating the re-written realm based on an IMSI block number (IBN) contained in the IMSI.

12. The system of claim 11, wherein a particular re-write rule indicates where the IBN is contained within the IMSI and how the IBN is to be inserted into the re-written realm.

13. The system of claim 8, wherein the identity for the device is a temporary identifier for the device.

14. The system of claim 13, wherein the temporary identifier for the device is a Globally Unique Temporary Identifier (GUTI) and wherein re-writing the realm includes generating the re-written realm based on a Mobility Management Entity (MME) Group Identity (MMEGI) included in the GUTI.

15. One or more non-transitory computer-readable storage media encoded with instructions that, when executed by a processor, cause the processor to perform operations, comprising:
obtaining an access request for a device to access a visited access network, wherein the access request includes an authentication identifier for the device, and wherein the authentication identifier includes an identity for the device and a realm comprising a network identifying portion;
determining a re-write rule for the realm by querying a database based on an identity type of the identity for the device and the network identifying portion of the realm, wherein the database includes a plurality of entries, each entry including a particular network code, a particular country code, a particular identity type, and a particular re-write rule for re-writing a realm for a particular device associated with the particular network code, the particular country code, and the particular identity type;
re-writing the realm based on the re-write rule using the identity for the device to generate a re-written realm;
obtaining, based on the re-written realm, an address for an authentication server of an identity provider associated with the device; and
performing an authentication with the authentication server using the authentication identifier for the device to authenticate the device for the visited access network.

16. The one or more non-transitory computer-readable storage media of claim 15, wherein the network identifying portion of the realm includes a network code and a country code and wherein the instructions that cause the processor to query the database further comprise instructions that cause the processor to perform further operations comprising:
querying the database using the country code and the network code associated with the identity.

17. The one or more non-transitory computer-readable storage media of claim 15, wherein at least one re-write rule included in the database facilitates generating one or more re-written realms that are publicly resolvable.

18. The one or more non-transitory computer-readable storage media of claim 15, wherein the identity for the device is an International Mobile Subscriber Identity (IMSI) and wherein re-writing the realm includes generating the re-written realm based on an IMSI block number (IBN) contained in the IMSI.

19. The one or more non-transitory computer-readable storage media of claim 18, wherein a particular re-write rule indicates where the IBN is contained within the IMSI and how the IBN is to be inserted into the re-written realm.

20. The one or more non-transitory computer-readable storage media of claim 15, wherein the identity for the device is a temporary identifier for the device.

* * * * *